United States Patent [19]

Novey

[11] Patent Number: 4,485,578

[45] Date of Patent: Dec. 4, 1984

[54] ADJUSTABLE SUPPORTS FOR FISHING RODS AND THE LIKE

[76] Inventor: Richard T. Novey, 1031 Linden Ave., Glendale, Calif. 91201

[21] Appl. No.: 400,344

[22] Filed: Jul. 21, 1982

[51] Int. Cl.³ ............................................. A01K 97/10
[52] U.S. Cl. ..................... 43/21.2; 224/922; 248/534; 211/68; 211/89; 24/556; 24/571
[58] Field of Search ................. 43/21.2; 248/304, 305, 248/308, 534, 540, 316.9; 224/922, 915, 42.45 R, 311, 268; 211/60 R, 87, 89, 96, 64, 68, 309, 42.42 R; 24/556, 571, 521, 564, 130, 129 R

[56] References Cited

U.S. PATENT DOCUMENTS

| 316,062 | 4/1885 | Riessner | 211/89 |
| 1,198,840 | 9/1916 | Hanck et al. | 248/534 |
| 1,250,308 | 12/1917 | Hanson | 24/556 |
| 1,616,013 | 2/1927 | Warren | 248/304 |
| 2,263,554 | 11/1941 | Brach | 248/540 |
| 3,767,093 | 10/1973 | Pinkerton et al. | 211/64 |

Primary Examiner—Nicholas P. Godici
Assistant Examiner—P. Weston Musselman, Jr.
Attorney, Agent, or Firm—William H. Maxwell

[57] ABSTRACT

Cooperative supports for fishing rods and the like wherein upwardly open U-shaped and V-shaped members are individually swiveled on vertically mounted axes, the U-shaped member being resilient with detents of varied size for the reception of a range of rod diameters at one end thereof, and the V-shaped member being rigid and with a rack and pinion manually operable and held by detent action to engage and snub a range of rod diameters at the other end thereof, the two dissimilar supports releasably securing the handle at said one end and the tip portion at said other end of the rod for its safe storage.

12 Claims, 6 Drawing Figures

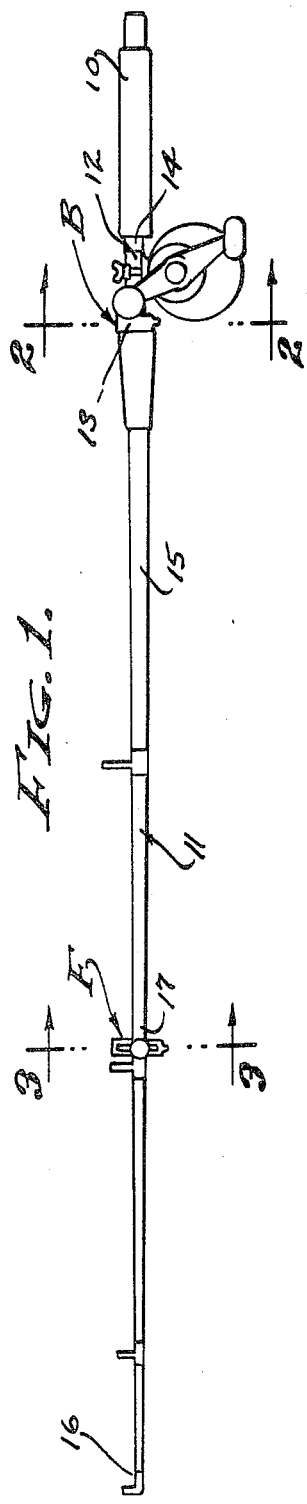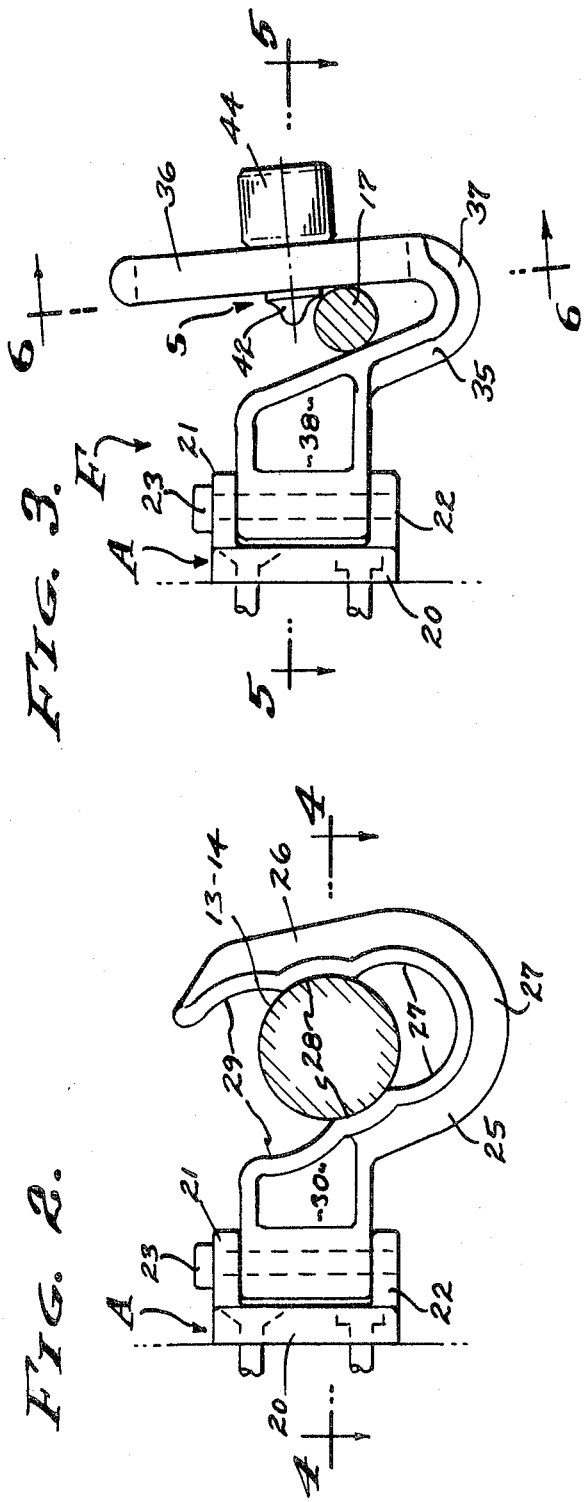

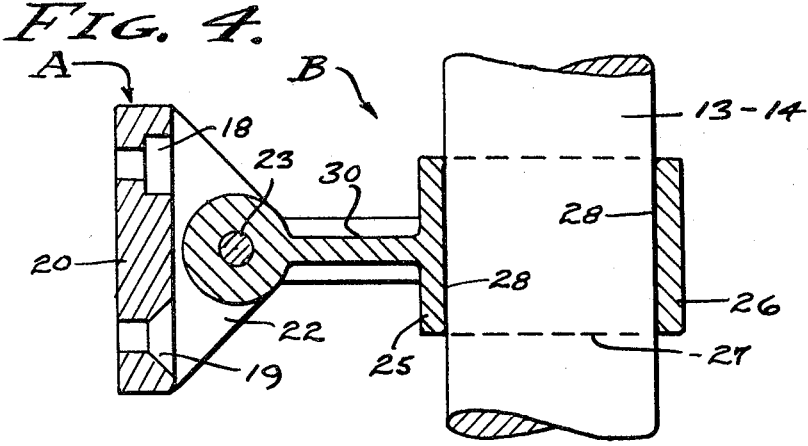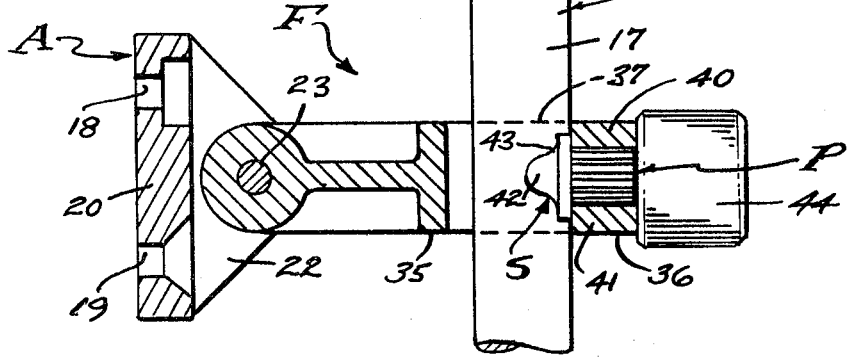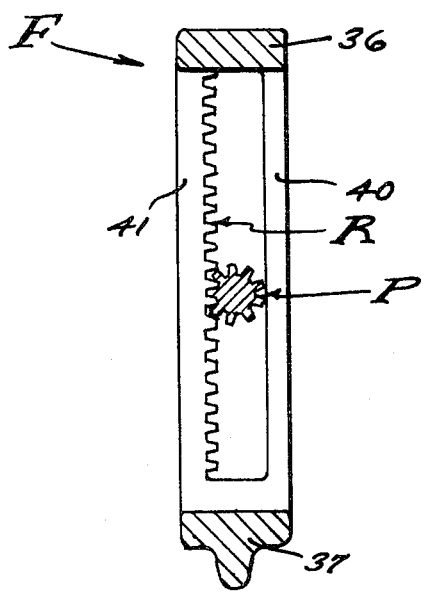

ADJUSTABLE SUPPORTS FOR FISHING RODS AND THE LIKE

BACKGROUND

Long slender objects such as fishing poles or rods and the like are difficult to store and care for, since they tend to be awkward and fragile and with a number of exposed features including eyes or fairleads, line leaders, and the reel for handling the fishing line. Fishing poles vary greatly in weight, which involves stiffness or flexibility, length and diameter. Regardless of the flexibility, it is desirable to store fishing poles or rods in a straight condition, supported at spaced intervals intermediate the opposite ends thereof; and it is to this objective that I have provided the pair of dissimilar and cooperatively adjustable supports of the present invention.

Fishing poles or rods are comprised generally of a handle or grip portion that extends from a butt to the reel seat, and the rod per se that extends from the reel seat to the tip of the pole. It is an object of this invention to provide an adjustable support for the larger diameter end of the pole at the reel seat, and it is also an object of this invention to provide an adjustable support for the smaller diameter end of the pole near the tip thereof. The first support at the reel seat can be applied to the pole ahead of or behind the reel seat as may be required, depending upon the diameter of the pole ahead of and behind this portion. And, the second support near the tip can be applied substantially behind or inward of said tip. Spacing of these two supports will vary as circumstances require, depending upon the size of the fishing pole or rod, and its heft.

The primary purpose of this invention is to provide means by which fishing poles are stowed and made secure against the sides of recreation vehicles or cabin walls, and like situations. For example, the trunk cabin of a sports vessel can be equipped with the two cooperative supports as they are hereinafter described, in order to securely store the poles or rods above the deck or floor and where they are safe and cannot be trampled.

Referring now to what I will term the rear support, it is the butt end or handle of the fishing pole or rod that is supported thereby. Fishing poles are of one of several standardized diameters at the reel seat, and accordingly the handle support of this invention is adjustable to this standard range of variation in handle or rod diameter at that portion. Likewise, fishing poles vary greatly in diameter at the tip portion, and accordingly the tip support of this invention is adjustable to an adequate range of variations in tip portion diameter. In practice, the handle portion support is characterized by an upwardly open U-shaped spring member with opposed detents for the releasable securement of the pole at the handle end, while the tip portion support is characterized by an upwardly open V-shaped (rigid) member having a rack with a pinion shifted by rotation into engagement with the various pole diameters for securement therof.

It is not uncommon for recreation vehicle bodies and cabins of sports vessels to have contoured exterior configurations, and to this end the two cooperative supports of the present invention swivel about vertical axes, in order to automatically align with the portion of the pole or rod engaged thereby; also to align with any deflection, curvature or warp that a pole may have or be subjected to. In practice, the two supports of the present invention are injection molded of plastic, and they are assembled of parts pinned and press-fitted together with or without solvents, as may be desired.

SUMMARY OF INVENTION

This invention relates to the storage of fishing rods and the like, it being an object to securely store a rod in a safe condition. It is preferred that the rod be secured horizontally and supported near each of its opposite ends. Accordingly, I provide two dissimilar supports that cooperate to releasably engage the fishing rod at its handle and at its tip portions, respectively. The larger diameter and sturdier handle portion of the rod is snapped into a resilient U-shaped member having detents for the accommodation of variations in diameter. And, the smaller diameter and more fragile tip portion of the rod is wedged into a substantially rigid V-shaped member having a snubbing means comprised of a rack and pinion shifted manually into rod engagement in order to accommodate variations in diameter and held secure by detent action. The U-shaped and V-shaped members are open upwardly to receive the rod portions through the action of gravity, and as well they operate through detent action to prevent dislogement under ordinary conditions.

The foregoing and various other objects and features of this invention will be apparent and fully understood from the following detailed description of the typical preferred form and application thereof, throughout which description reference is made to the accompanying drawings.

FIG. 1 is a side elevational view of a fishing rod safely secured by the two cooperative supports of the present invention.

FIGS. 2 and 3 are enlarged side views of the back and front supports, individually, and taken as indicated by lines 2—2 and 3—3 on FIG. 1.

FIG. 4 is an enlarged detailed sectional view of the back support taken as indicated by line 4—4 on FIG. 2, and FIG. 5 is an enlarged detailed sectional view of the front support taken as indicated by line 5—5 on FIG. 3.

And, FIG. 6 is a detailed sectional view taken as indicated by line 6—6 on FIG. 3.

PREFERRED EMBODIMENT

Referring now to the drawings, there are cooperative front and back supports F and B for releasably securing the rod of a fishing pole in a safe condition, preferably horizontally disposed. Characteristically, the supports F and B are V-shaped and U-shaped members respectively, and they are mounted so as to swivel on spaced vertically disposed axes. The supports F and B are disclosed herein adapted to be mounted to a substantially vertically disposed wall, a wall with or without curvature; it being understood that it is possible to adapt the mountings to substantially horizontal walls, roofs, or decks.

A fishing pole is comprised, generally, of a grip or handle 10 separated from a rod 11 by a reel seat 12. The handle 10 is of the largest diameter, often contoured to form a comfortable grip; and adjacently in front of and behind the reel seat 12 the rod is of a consistantly moderately large diameter as shown at 13 and 14. In practice, the reel seat is a fitting having a standardized diameter of $\frac{7}{8}$, 1 or 1$\frac{1}{8}$ inch. The rod per se 15 is tapered from the diameter 13 toward a smaller tip diameter 16, and it is near the tip that an intermediate portion 17 of the rod is nominally small in diameter. It is the rod diameters at 13 or 14 and at 17 which are dependent upon the size and or weight of the fishing pole, and which may vary from pole to pole. The supports F and B as hereinafter described accommodate these variations, within the standardization and range of diameter commensurate with the many fishing poles that are presently in use.

The support members F and B are openly shaped members swivelly carried by a base A and thereby adapted to be mounted to a supporting wall. The base A is the same for the front and back support F and B and a description of one will suffice for both. The base A is comprised of a flat pad 20 with fastener openings 18 and 19 counterbored and/or countersunk therein as shown, to receive fastener means as is indicated. In practice, the pad 20 is rectangular with top and bottom margins from which parallel ears 21 and 22 project, and through which ears there are coaxial bores to receive a pivot pin 23 on which the supports F and B swivel. The said axis (axes) is parallel to the pad and to the face of the supporting wall. The axis of pin or pins 23 is vertical as shown; unless it be desired that the supports F and B are to open other than upwardly as preferred.

The U-shaped member of support B is a resilient member, having a pair of upstanding legs 25 and 26 joined by an arcuate spring portion 27. The inner leg 25 is carried by a bracket 30 through which there is a vertical bore to pass the aforementioned pin 23. The bracket 30 closely fits between the mounting ears 21, so that there is a friction fit therebetween, the pin turning free in the bracket. In practice, the pin 23 is press fitted into the ear 21 for its securement. The legs 25 and 26 are essentially alike, the U-shaped member being symmetrical, and in accordance with this invention they are featured with pairs of opposite concaved recesses, 27, 28 and 29. The pair of recesses 27 is formed concentric with a $\frac{7}{8}$ inch diameter, the pair of recesses 28 is formed concentric with a 1 (one) inch diameter, and the pair of recesses 29 is formed concentric with a $1\frac{1}{8}$ inch diameter. The centers of diameter of the recesses 27, 28 and 29 are spaced nominally one half diameter apart in each instance, and as shown the joinders thereof are radiused or rounded so that abrasion with the rod is avoided. Accordingly, rod diameters at 13 and 14 of $\frac{7}{8}$ inch, 1 inch, or $1\frac{1}{8}$ inch can be readily accommodated and snapped into position without thought or contemplation, and held by detent action by virtue of the yieldingly flexible support member F that forms the opposed pairs of recesses pressed into supporting engagement with a corresponding rod diameter, all as a matter of inherency.

The V-shaped member or support F is essentially rigid, although preferably of the same material as support B, having a pair of upstanding legs 35 and 36 joined by a tightly radiused throat portion 37. The inner leg 35 is carried by a bracket 38 through which there is a vertical bore to pass the aforementioned pin 23. The bracket 38 closely fits between the mounting ears 21, so that there is a friction fit therebetween, the pin turning free in the bracket. In practice, the pin 23 is press fitted into the ear 21 for its securement. The legs 35 and 36 are straight and divergent at an angle of 15°, joined by an $\frac{1}{8}$ inch inside radius at the throat portion 37. In practice, the leg 35 is angularly disposed, while the leg 36 is vertically disposed, the former being substantially less in height than the latter, for purposes as next described. As shown, the divergent legs are spaced substantially $\frac{3}{8}$ inch at the top extremity of leg 35, thereby providing a rod diameter reception range of $\frac{1}{4}$ inch to $\frac{3}{8}$ inch, which is ample.

In accordance with this invention, I provide snubber means S which has a closely spaced detent action and characterized by a manually operable rack and pinion adjustment for the capture of the aforementioned rod diameter 17 ranging from $\frac{1}{8}$ ($\frac{1}{4}$) to $\frac{3}{8}$ inch at the tip portion of the fishing pole rod. Accordingly, the leg 36 is slotted so as to have parallel side portions 40 and 41 between which a pinion P operates in engagement with a rack R and the inside of one of said legs shown as the leg portion 41. The axis of the pinion P is normal to and intersects the axis of pin 23, and it is shiftable vertically for adjustment. The rack R is coextensive with the slot that separates the side portions 40 and 41, the inside of one of the side portions of the rack being flat and smooth, as shown the leg portion 40. A straight spur gear form is employed wherein the pitch circle of the pinion P operates tangent to the pitch line of the rack R, and so that the addendum of the pinion establishes an outer diameter thereof which bears against the inner wall of leg portion 41. Thus, the bearing engagement of two adjacently spaced teeth of the pinion provides a detent action that adequately stops the pinion from accidental rotation, there being a resilient interference fit between the pinion P and leg portion 41 when the diametrically opposite teeth thereof are fully engaged with the rack R.

From the foregoing, it will be apparent that I have provided for the very effective and safe stowage of fishing poles, by means of clamped engagement with the larger and smaller diameters thereof. At the seat of the pole, the back support B snaps over the standard rod diameters at 13 or 14. At the tip portion 17 of the pole, the front support F is manually operated to snub a rod diameter between the legs 35 and 36, here the said rod is wedged by a bearing lug 42 that projects from the pinion P to occupy a part of the space between the legs. In practice, the lug 42 is a turned button-shaped projection that has a fillet 43 of 1/16 inch radius, whereby a rod diameter of $\frac{1}{8}$ inch diameter is accommodated. The pinion P is rotated by means of a manually engageable knob 44 at the outside of the leg 36 and bearing against the two side portions thereof, while the lug 42 bears against the inside of the leg portions. In practice, the pinion-lug-knob assembly is made secure by press fitting the pinion into the knob, the pinion and lug being integral. The lug 42 in its highest position clears a $\frac{3}{8}$ inch diameter rod, and at its lowest position snubs a $\frac{1}{8}$ inch diameter rod. The two supports F and B are mounted in spaced relation as circumstances require in order to engage with those portions of the pole rod as described.

Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

1. A support for the reception of a horizontally disposed diameter portion of a fishing rod and the like and comprised of an upwardly open V-shaped support member carried by a wall mounting bracket and having divergent upstanding legs with snubber means including a rack formed in one of said legs to receive a manually rotatable pinion positioned by the rack into vertical adjustment along said leg in opposition to the other leg and projecting from said leg to overlie and releasably engage with the diameter portion of the fishing rod to capture the same against the other leg.

2. The fishing rod support as set forth in claim 1, wherein said one of said legs is formed with a slot into parallel side portions, the inside of one side portion being opposed to the rack formed of the inside of the other side portion, and the pinion being held in meshed engagement with the rack by the opposed inside of the said one side portion.

3. The fishing rod support as set forth in claim 1, wherein said one of said legs is formed with a slot into parallel side portions, the inside of one side portion being opposed to the rack formed of the inside of the other side portion, and the pinion having a pair of teeth diametrically opposite its meshed engagement with the rack to have detented engagement with the opposed inside of said one side portion and to hold the pinion meshed with the rack.

4. The fishing rod support as set forth in claim 1, wherein said one of said legs is formed with a slot into parallel side portions, the inside of one side portion being opposed to the rack formed of the inside of the other side portion, and the pinion extending axially through the slot with a manually accessible knob at the outside of the leg and with a lug engageable with a rod diameter at the inside of the leg.

5. The fishing rod support as set forth in claim 1, wherein said one of said legs is formed with a slot into parallel side portions, the inside of one side portion being opposed to the rack formed of the inside of the other side portion, the pinion extending axially through the slot with a manually accessible knob at the outside of the leg and with a lug engageable with a rod diameter at the inside of the leg, and the pinion having a pair of teeth diametrically opposite its meshed engagement with the rack to have detented engagement with the opposed inside of said one side portion and to hold the pinion meshed with the rack.

6. The fishing rod support as set forth in any one of claims 1, 2, 3, 4 or 5, wherein the upwardly open support member is swively carried by a pivot pin on a vertically disposed axis parallel to the wall mounting bracket.

7. Cooperative back and front supports for fishing rods and the like and comprised of upwardly open members for the reception of opposite end diameter portions of the fishing rod at the handle and near the tip thereof,
   the back support member being U-shaped with upstanding legs having at least one pair of opposed concentrically concaved seats releasably engageable with a diameter portion of the fishing pole at the handle end thereof to capture the same,
   the front support member being V-shaped with upstanding divergent legs and a snubber means including a rack formed in one of said legs to receive a manually rotatable pinion positioned by the rack into vertical adjustment along said leg in opposition to the other leg and projecting from said leg to overlie and engageable with a diameter portion of the fishing pole near the tip thereof to capture the same against the other leg.

8. The cooperative supports for fishing rods as set forth in claim 7, wherein the upstanding legs of the back support member are resilient and have at least one pair of opposed concentrically concaved seats yieldingly engageable with said diameter portion of the fishing rod to releasably capture the same, and wherein one of the upstanding legs of the front support member is formed with a slot into parallel side portions, the inside of one side portion being opposed to the rack formed of the inside of the other side portion, and the pinion being held in meshed engagement with the rack by the opposed inside of the said one side portion.

9. The cooperative supports for fishing rods as set forth in claim 7, wherein the upstanding legs of the back support member are resilient and having at least two pairs of opposed concentrically concaved seats and one pair disposed above the other and each pair of seats being formed to a diameter of concavity conforming to a different standardized fishing rod diameter and yieldingly engageable therewith to releasably capture the same, and wherein one of said legs of the front support member is formed with a slot into parallel side portions, the inside of one side portion being opposed to the rack formed of the inside of the other side portion, and the pinion having a pair of teeth diametrically opposite its meshed engagement with the rack to have detented engagement with the opposed inside of said one side portion and to hold the pinion meshed with the rack.

10. The cooperative rod support for fishing rods as set forth in claim 7, wherein the upstanding legs of the back support member are resilient and having three pairs of opposed concentrically concaved seats and the larger diameter pair being disposed above the smaller, a lowermost pair of seats being formed to a smallest standardized fishing rod diameter, an intermediate pair of seats being formed to a larger standardized fishing rod diameter, and an uppermost pair of seats being formed to a largest standardized fishing rod diameter, each of said pairs of seats being yieldingly engageable with its standardized fishing rod diameter to releasably capture the same, and wherein one of said legs of the front support member is formed with a slot into parallel side portions, the inside of one side portion being opposed to the rack formed of the inside of the other side portion, and the pinion extending axially through the slot with a manually accessible knob at the outside of the leg and with a lug engageable with a rod diameter at the inside of the leg.

11. The cooperative supports for fishing rods as set forth in claim 7, wherein the upstanding legs of the back support member are resilient and have at least one pair of opposed concentrically concaved seats yieldingly engageable with said diameter portion of the fishing rod to releasably capture the same, and wherein said one leg of the front support member is formed with a slot into parallel side portions, the inside of one side portion being opposed to the rack formed of the inside of the other side portion, the pinion extending axially through the slot with a manually accessible knob at the outside of the leg and with a lug engageable with a rod diameter at the inside of the leg, and the pinion having a pair of teeth diametrically opposite its meshed engagement with the rack to have detented engagement with the opposed inside of said one side portion and to hold the pinion meshed with the rack.

12. The cooperative supports for fishing rods as set forth in any one of claims 7, 8, 9, 10 or 11, wherein the upwardly open back and front support members are swively carried by a pivot pin on a vertically disposed axis parallel to the wall mounting bracket.

* * * * *